Oct. 27, 1931. J. C. CROWLEY 1,829,556
VALVE INSIDE
Filed March 16, 1929
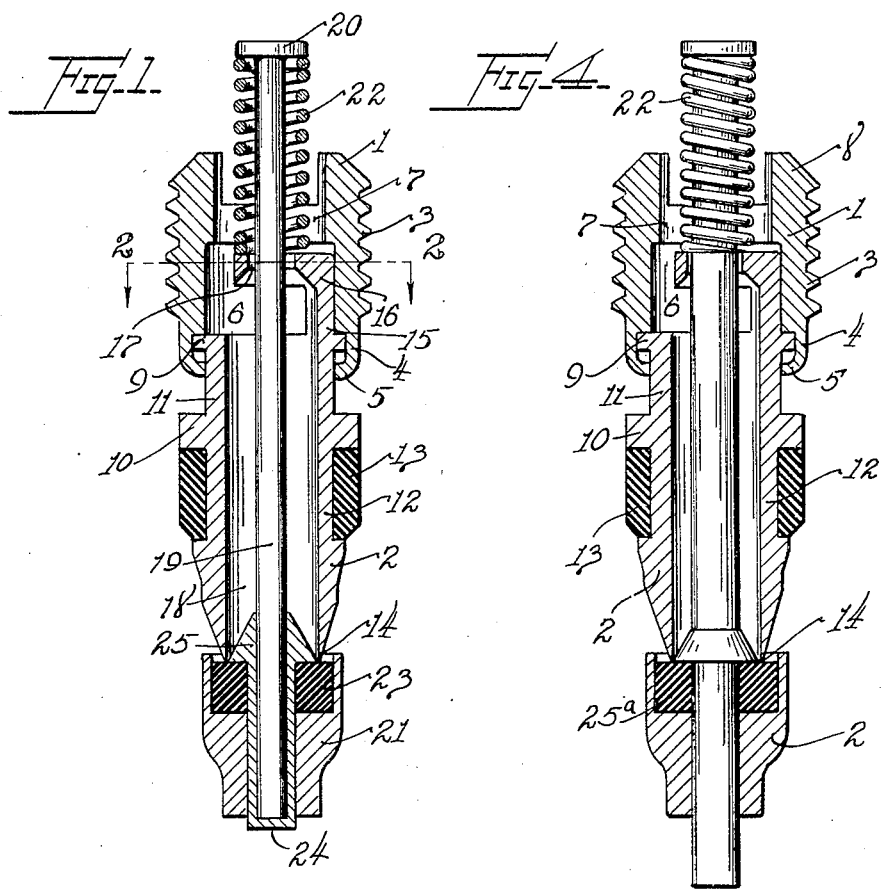
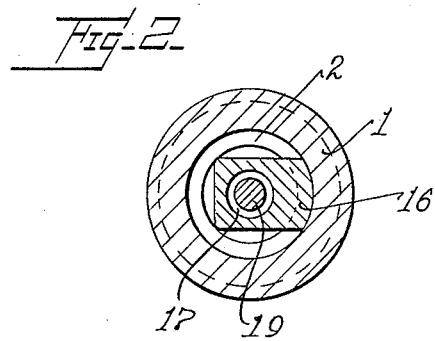
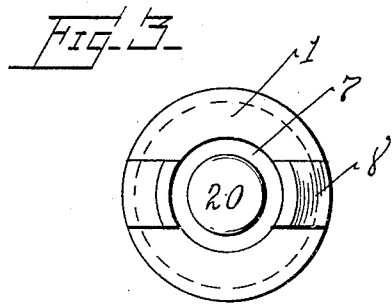
Inventor:
John C. Crowley
Kwis Hudson & Kent
Attys.

Patented Oct. 27, 1931

1,829,556

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

VALVE INSIDE

Application filed March 16, 1929. Serial No. 347,469.

The present invention relates to valve insides which, as is well known, are intended to be inserted within a valve stem commonly used in connection with air inflated tubes, such as inner tubes for automobile tires and the like.

An object of the present invention is to provide a valve insides in which the air passageways through the valve insides are greatly increased over any form of valve insides heretofore known.

Another object is to provide a valve insides in which a part of the body member of the insides may be positioned in a valve stem by an axial movement of said part into the stem and in which said part forms the sole supporting means for the valve pin and valve pin spring, wherefore these elements are not subjected to any twisting or straining action while the valve insides are being positioned in the valve stem.

Another object is to provide a valve insides which is so constructed that the valve pin is more efficiently guided and, in addition, permits of the use of a smaller valve pin, thus increasing the size of the air passageways through the valve insides.

A further object is to provide a valve insides which is more compact, simple in construction and more economically manufactured.

Additional objects and advantages will appear hereinafter.

Reference should be had to the accompanying drawings forming a part of the specification in which, Fig. 1 is a sectional view through the valve insides.

Fig. 2 is a sectional view taken on line 2—2 of Fig. 1.

Fig. 3 is a top plan view.

Fig. 4 is a view similar to Fig. 1 but showing a slightly modified form of construction.

In the present disclosure it will be understood that the valve insides are intended primarily for use in connection with the standard and usual form of valve stem which is, at present, used in connection with inner tubes for tires, although the use of the valve insides is not restricted to this precise application or use. The standard valve stem needs no description on account of its universal use, but it may be stated that the standard valve stem has an inner bore which is threaded at the outer end thereof for the purpose of receiving the threads upon a valve insides. The bore of the valve stem is provided at a short distance from the threaded end of the stem with a reduced portion which forms a shoulder against which a suitable packing member on the valve insides engages for the purpose of effecting an air tight-seal and thereby preventing the escape of air around the body of the valve insides.

The body of the valve insides is formed of two parts, namely, part 1 and part 2. The part 1 is provided with exterior threads 3 and adjacent its lower end a downwardly extending flange 4 is provided with an inturned part 5. The part 1 is provided with a central passageway or bore having an enlarged portion 6 for a part of the length of the bore and a portion 7 of slightly less diameter for the remaining length of the bore, this latter portion being adjacent the outer end of the part 1. The outer end of the part 1 is also provided with recesses 8 which extend outwardly toward the edges of the part 1 and are diametrically opposite, the purpose of such recesses being to receive a wrench when the valve insides are being positioned in a valve stem. The other part of the body member is formed adjacent its upper end with an outturned flange 9 spaced from another outwardly extending flange 10. Between these flanges there is, therefore, an annular recess 11 within which the inwardly extending part 5 of the flange 4 on the body member part 1 extends, so that the part 5 may be said to lie between the flanges 9 and 10. There is effected a swivel connection between the two parts of the body member with the result that the part 2 may be inserted into a valve stem and forced longitudinally into proper position therein by the rotation of the part 1, the exterior threads 3 of which engage the interior threads of the valve stem. In other words, the part 2 merely has an axial movement into the valve stem, while the part 1 is positioned therein by rotating movement. Beyond the flange 10 a recess 12 is formed in the body member for the purpose of receiving a suitable packing member 13 which cooperates with the valve stem to form an air-tight connection. The lower end of the part 2 is externally tapered so that the lower edge of such part, indicated at 14, forms a relatively narrow valve seat.

Adjacent the upper end of the part 2 a portion of the wall extends upwardly beyond the flange 9, as indicated at 15, into the enlarged portion 6 of the bore through the part 1, such upwardly extending portion 15 being provided at its upper end with an inturned portion 16, which extends part of the way across the bore in the part 1 and is provided with a relatively small opening 17 concentric with the bore through the part 1. There is, of course, a central air passageway or bore 18 through the part 2 of the body member, which passageway is concentric with the passageway in the part 1. It will be seen that the passageways 18 in the part 2 and the passageway in the part 1 formed of the portions 6 and 7 provides a maximum air passageway through the valve insides and that the inturned portion 16 of the part 2 offers a minimum restriction to such air passageway. Extending through the air passageways the valve pin 19 has at its upper end an annular head 20, while its lower end is connected to a valve member 21 which cooperates with the valve seat 14 on the part 2. The valve pin 19 extends through the opening 17 in the inturned portion 16, while a valve spring 22 arranged on the pin between the head 20 and the inturned portion 16 of the body member tends to normally force the pin inwardly and to cause the valve member 21 to engage its seat 14.

In both Figs. 1 and 4 the valve member 21 is disclosed as formed in the nature of a cup-shaped member which has packing 23 in the cup portion thereof. However, in Fig. 1, a sleeve 24 extends axially through the valve member 21 and the packing 23, such sleeve being provided at its upper end above the valve member with an enlarged so-called "ball" portion 25, the tapered sides of which engage the lower edge of the part 2 of the body member when the valve member 21 is moved into and out of seating position. In the form shown in Fig. 1 the valve pin 19 has its lower end secured in the sleeve member 24 and since the ball 25 is carried by the sleeve member the result is that a smaller diameter valve pin may be used than is possible in the ordinary form of construction wherein the ball 25a is formed on the valve pin as shown in Fig. 4, while the lower end of the valve pin extends through the valve member. It will be noted that the valve pin is guided at 2 points, namely, by the inturned portion 16 of the body member part 2 and by the valve member 21. In addition to this function of the inturned portion 16 the same also serves as the lower abutment for the spring 22. It should further be noted, as already mentioned, that the inturned portion 16 offers a minimum obstruction or restriction to the air passageways through the valve insides.

A further and very important consideration resides in the fact that when the valve insides are being assembled in the valve stem no twisting or straining action will be imparted to the valve pin or the valve spring 22 since these elements are carried solely by the body member part 2 and the valve member 21, which members do not rotate but are forced axially into the valve stem by the rotation of the body member part 1. Also it should be noted that the provision of the inturned portion 16, which might be termed a bridging member, intermediate the ends of the body member results in a more compact and simple arrangement and is also capable of being more economically produced.

It should be understood that the invention is susceptible of various modifications and adaptations within the scope of the appended claims.

Having thus described my invention, I claim:

1. A valve insides comprising a body member having a central air passageway, a valve pin extending through said passageway, a valve member cooperating with the lower edge of said body member, said valve member being provided with an axially arranged sleeve having an enlarged portion at its upper end forming a valve ball, and said valve pin being secured within said sleeve.

2. A valve insides comprising a body member formed of two parts having a swivel connection and provided with communicating air passageways, one of said parts having an inturned portion intermediate the ends of the body member extending partly across said air passageway therein and provided with an opening, a valve pin arranged in the body member and extending through the opening in the said inturned portion, a valve member associated with the lower end of the valve pin and having a sleeve axially arranged therein and provided at its upper end with an enlarged portion forming a valve ball, and a spring on said valve pin bearing at one end against the inturned portion and at its other end engaging with means associated with the valve pin.

In testimony whereof, I hereunto affix my signature.

JOHN C. CROWLEY.